(12) United States Patent
Imai et al.

(10) Patent No.: US 8,741,075 B2
(45) Date of Patent: Jun. 3, 2014

(54) METHOD FOR MANUFACTURING A HOT PRESS-FORMED MEMBER

(75) Inventors: Kazuhito Imai, Amagasaki (JP); Masanobu Ichikawa, Nisshin (JP)

(73) Assignees: Nippon Steel & Sumitomo Metal Corporation, Tokyo (JP); Toyoda Iron Works Co., Ltd., Aichi (JP)

( * ) Notice: Subject to any disclaimer, the term of this patent is extended or adjusted under 35 U.S.C. 154(b) by 64 days.

(21) Appl. No.: 13/533,102

(22) Filed: Jun. 26, 2012

(65) Prior Publication Data

US 2012/0325377 A1    Dec. 27, 2012

Related U.S. Application Data

(63) Continuation of application No. PCT/JP2010/072850, filed on Dec. 20, 2010.

(30) Foreign Application Priority Data

Dec. 28, 2009    (JP) .................................. 2009-297232

(51) Int. Cl.
  *B21C 23/24*    (2006.01)
  *B21C 23/22*    (2006.01)
(52) U.S. Cl.
  USPC ................ 148/284; 72/47; 148/306; 148/320
(58) Field of Classification Search
  USPC ............................ 148/284, 306, 320; 72/47
  See application file for complete search history.

(56) References Cited

U.S. PATENT DOCUMENTS

2005/0252262 A1 *    11/2005    Imai et al. ........................ 72/47

FOREIGN PATENT DOCUMENTS

| JP | 2001-353548 | 12/2001 |
| JP | 2003-073774 | 3/2003 |
| JP | 2003-126920 | 5/2003 |
| JP | 2003-126921 | 5/2003 |
| JP | 2005-113233 | 4/2005 |

* cited by examiner

*Primary Examiner* — Lois Zheng
(74) *Attorney, Agent, or Firm* — Clark & Brody

(57) ABSTRACT

A method of producing a hot press-formed member having good corrosion resistance comprises subjecting a zinc-based plated steel sheet to heat treatment by heating to a temperature region of 600-750° C. at a rate of temperature increase up to 600° C. of at most 50° C. per second followed by cooling to 550° C. or below to form a steel blank which has a zinc oxide layer in its uppermost surface portion and below it a zinc-iron alloy phase having an Fe content of at least 25 mass %. This steel blank is heated to a temperature of at least its $Ac_3$ point, then press formed immediately at a temperature of at least its $Ac_3$ point, and then rapidly cooled. The hot press-formed member has a surface region with zinc oxide and iron-zinc solid solution phases and not containing an intermetallic compound phase or a pure zinc phase.

2 Claims, No Drawings

METHOD FOR MANUFACTURING A HOT PRESS-FORMED MEMBER

TECHNICAL FIELD

This invention relates to a method for manufacturing a hot press-formed member.

BACKGROUND ART

In order to promote decreases in the weight of automobiles and improve their safety, it is positively carried out to decrease the weight of steel used in automobiles to by increasing its strength. However, various types of steel sheets for use in automobiles have a press formability which decreases as their strength is increased, and this makes it difficult to carry out press forming of a steel sheet into a steel panel part having a complicated shape.

Under the circumstances, hot press forming is being increasingly utilized as a technique for obtaining high-strength steel parts having complicated shapes. In hot press forming, press working is applied to a steel sheet which is heated to a high temperature at which it is in a soft and highly ductile state, which makes it possible to form complicated shapes even with a high-strength steel sheet. In addition, by heating a steel sheet to the austenite region and then carrying out press forming of the heated steel sheet using a die followed by rapid cooling inside the die, quench hardening can be carried out at the same time as press forming, and it is possible to utilize an increase in strength due to martensitic transformation.

When hot press forming is applied to a steel sheet with no special surface coating (such as a common hot rolled or cold rolled steel sheet), if heating prior to press forming is carried out in an oxidizing atmosphere such as in air, scale (an iron oxide) is unavoidably formed on the surface of the steel sheet. Scale formed on the surface of a steel sheet easily peels off and can lead to damage of the die during press forming or to peeling of a painted film after a hot press-formed article is painted, thereby causing the corrosion resistance of the article to decrease. Therefore, in the manufacture of a hot press-formed article, it is necessary to carry out heating in a non-oxidizing atmosphere in order to suppress the formation of scale or to perform shot blasting after hot press forming in an oxidizing atmosphere in order to adequately remove scale formed on the surface of a formed article. Either method leads to an increase in manufacturing costs.

In order to suppress the formation of scale in hot press forming, it has been proposed to carry out hot press forming on a plated steel sheet having a coating on its surface. For example, Patent Documents 1-4 disclose hot press forming of a plated steel sheet having a zinc-based coating (a zinc-based plated steel sheet) which is used as a blank being formed.

PRIOR ART DOCUMENTS

Patent Documents

Patent Document 1: JP 2001-353548 A
Patent Document 2: JP 2003-73774 A
Patent Document 3: JP 2003-126920 A
Patent Document 4: JP 2003-126921 A

SUMMARY OF THE INVENTION

It was found that hot press forming of a zinc-based plated steel sheet has the problem that corrosion resistance after painting of the press-formed member is not necessarily stable.

The object of the present invention is to provide a method for manufacturing a hot press-formed member using a zinc-based plated steel sheet which can stably manufacture a hot press-formed member having good corrosion resistance after painting.

The present inventors found that by performing hot press forming after a zinc-based plated steel sheet is initially subjected to heat treatment to confer a particular surface condition, it is possible to stably and reliably mass produce hot press-formed members having various desirable properties including corrosion resistance after painting.

The present invention is a method for manufacturing a hot press-formed member characterized by subjecting a zinc-based plated steel sheet to heat treatment which includes a first heating step in which the steel sheet is heated in an oxygen-containing atmosphere to a temperature region of at least 600° C. to at most 750° C. at an average rate of temperature increase up to 600° C. of at most 50° C. per second and a first cooling step in which the steel sheet which was heated in the first heating step is cooled to 550° C. or below, resulting in the formation of a steel blank having on the surface of the steel sheet a zinc oxide layer constituting an uppermost layer and below it a zinc-iron alloy phase having an Fe content of at least 25 mass %, then heating the steel blank in a second heating step to a temperature of at least the $Ac_3$ point of the steel constituting the sheet, and carrying out a hot press forming step on the heated steel blank by starting press forming when the temperature of the steel blank is at least the $Ac_3$ point and then rapidly cooling the press-formed member, thereby obtaining a hot press-formed member having a surface region which has a zinc oxide layer and an iron-zinc solid solution phase and which does not contain an intermetallic compound phase or a pure zinc phase.

According to the present invention, it is possible to stably and reliably mass produce hot press-formed members having various desirable properties such as corrosion resistance after painting by means of hot press forming of a zinc-based plated steel sheet.

Modes for Carrying Out the Invention

In a method for manufacturing a hot press-formed member according to the present invention, a zinc-based plated steel sheet is subjected to heat treatment including a first heating step and a first cooling step to obtain a steel blank in which the surface plated coating of the steel sheet is converted into a particular structure. After the steel blank is heated by a second heating step to a temperature necessary to obtain a high strength by quench hardening, it is subjected to press forming by a hot press forming step. These steps will be explained below in sequence.

[First Heating Step and First Cooling Step]

Prior to hot press forming, a zinc-based plated steel sheet is subjected to heat treatment by heating in a first heating step followed by cooling in a first cooling step. As a result of this heat treatment, a steel blank is obtained which has, on the surface of the steel sheet, a zinc oxide layer constituting an uppermost surface layer and below it a zinc-iron alloy phase having an Fe content of at least 25 mass %. By carrying out hot press forming on the steel blank which is imparted the above-described surface condition by the first heating step and the first cooling step, good corrosion resistance after painting can be achieved in a more stable manner compared to when press forming is directly carried out on a zinc-based plated steel sheet.

The uppermost zinc oxide layer is formed primarily by surface oxidation of a zinc-based plated coating. This zinc oxide layer may contain a hydroxide, and it may also contain a small amount of plating components or components derived from alloying (such as Al or Fe). Similarly, the zinc-iron alloy phase may contain components derived from the plating layer or the steel prior to heating.

The zinc-iron alloy phase is a zinc-containing layer present between the uppermost zinc oxide layer and the steel sheet substrate. In the present invention, this zinc-iron alloy phase has a high Fe content of at least 25 mass %. In a galvannealed steel sheet which is manufactured by subjecting a hot-dip zinc-plated is (galvanized) steel sheet to heat treatment at a temperature of around 500-550° C. in air, the Fe content of the plating layer is around 5-20 mass % and is typically 15 mass % or lower.

Among several types of zinc-iron intermetallic compounds, Γ phase ($Fe_3Zn_{10}$) has the highest Fe content, but its Fe content on an equilibrium phase diagram is approximately 20 mass %. Accordingly, the zinc-iron alloy phase having an Fe content of at least 25 mass % is considered to be an alloy phase in which zinc-iron intermetallic compound phases are intermixed with iron-zinc solid solution phases in which zinc and iron are mutually dissolved to form a solid solution.

In the first heating step, a zinc-iron alloy phase having an Fe content of at least 25 mass % is formed by causing alloying due to mutual diffusion between zinc in the plating layer and iron in the substrate to proceed. Namely, alloying is allowed to proceed until a solid solution phase is formed by dissolving a portion of zinc into iron. To this end, the heating temperature is made at least 600° C., at which temperature alloying between zinc and iron adequately progresses. At this time, surface oxidation of the plating layer also progresses, leading to the formation of a zinc oxide layer as an uppermost layer.

According to a Zn—Fe binary phase diagram, taking a Zn-30 mass % Fe alloy as an example, a portion of the alloy is present as a liquid phase at 782° C. or above. If the Fe content is smaller than 30 mass %, a liquid phase may be formed at a lower temperature (below, the temperature at which a liquid phase can form will sometimes be referred to as the melting point).

Accordingly, if heating in the first heating step is performed to reach a high temperature at a high heating rate, the temperature may reach the melting point or higher to form a liquid phase on the surface of the steel sheet before adequate alloying occurs, thereby causing molten zinc to adhere to the heating equipment or to evaporate or disappear.

Therefore, the heating temperature in the first heating step is selected so as not to become too high, and the rate of temperature increase is selected so as not to be too fast. Specifically, the heating temperature is made at 750° C. or lower, and the average rate of temperature increase in the range up to 600° C. is made at most 50° C. per second. As a result, evaporation or loss of zinc can be suppressed. The rate of temperature increase is preferably at most 25° C. per second and more preferably at most 10° C. per second.

In order to form a zinc oxide layer as an uppermost layer, the heating atmosphere is an oxygen-containing atmosphere. It is sufficient for the oxygen concentration in the atmosphere to be at least 0.5 volume %, and it is preferably at least 1 volume %. There is no particular need to set an upper limit on the oxygen concentration, but it is sufficient for the oxygen concentration to be up to the concentration in air (an oxygen concentration of 21 volume %). A gas atmosphere having an oxygen concentration lower than 21 volume % may be a mixture of air and a nitrogen gas. A dew point in the range of 10-60° C. is suitable for the gas used as the atmosphere.

As stated above, the heating temperature in the first heating step is at least 600° C. and at most 750° C. This heating temperature is preferably at least 630° C. and at most 720° C. and more preferably at least 650° C. and at most 700° C. In the first heating step, the heating atmosphere is an oxygen-containing atmosphere. Therefore, a zinc oxide layer is unavoidably formed as an uppermost layer from the initial stage of heating. Vaporization of zinc is suppressed by this zinc oxide layer even if the plating layer is partially melted.

The zinc-based plated steel sheet which is heated in the first heating step may be a steel strip or a cut sheet, or it may be a member which has already been subjected to blanking for the subsequent hot press forming step. Alternatively, it may have an intermediate shape by forming and cutting.

There is no particular limitation on the heating equipment used in the first heating step. It is possible to use conventional equipment such as a direct heating furnace, a gas furnace, a radiant heating furnace, an electrical-resistive heating furnace, a high-frequency heating furnace, or the like. The heating conditions may be suitably selected so as to obtain a zinc-based plated steel sheet having the above-described surface condition.

The holding time at the heating temperature in the first heating step is selected such that it is sufficient to convert the plating layer of the zinc-based plated steel sheet into a zinc-iron alloy phase having an Fe content of at least 25 mass %. This time depends upon the heating temperature, but in general it is preferable that the is residence time in the temperature region from the highest temperature to a temperature 50° C. lower than the highest temperature be in the range of 1-30 minutes.

A zinc-based plated steel sheet which is heated by the first heating step is then cooled to 550° C. or below in the first cooling step. There is no particular limitation on the cooling method. It is possible to wait until the sheet naturally cools to the desired temperature, or forced cooling by air cooling, water cooling, or the like may be used. Forcefully lowering the temperature to a certain extent makes it easier to stabilize the surface condition. The cooling rate may preferably be selected such that the residence time in a temperature region of 550° C. or above is at most 30 seconds and in particular at most 15 seconds.

With some steel chemical compositions, the heating temperature in the first heating step may exceed the $Ac_3$ point of the steel. In such cases, rapid cooling from this temperature region may cause the steel sheet to harden due to quenching, thereby worsening the workability of the sheet in subsequent handling. Therefore, in this case only, the cooling rate in the first cooling step is preferably set to a rate which is low enough to avoid quench hardening. For example, in the case of cooling to 400° C. or below, it is preferable that the cooling rate be at most 30° C. per second.

When the steel sheet has not been subjected to blanking, the steel sheet is cooled to room temperature in the first cooling step and then subjected to blanking to obtain a steel blank having a desired shape. When the steel sheet is in the form of a blank, the first cooling step may be completed at a suitable temperature which is 550° C. or below and the steel blank which is still at a high temperature may be immediately subjected to the next step (the second heating step for the hot press forming step).

As a result of the above-described heat treatment, a steel blank is obtained which has a zinc-iron alloy phase with an Fe content of at least 25 mass % formed between the uppermost zinc-oxide layer and the steel substrate. There is no particular limitation on the thickness of the zinc oxide layer and that of the zinc-iron alloy phase. The thickness of the layer or phase varies depending on the coating weight and type of the plating, and the heating conditions.

The presence of a zinc oxide layer and a zinc-iron alloy phase can be ascertained by SEM observation of a cross section of the steel sheet, X-ray diffraction, and if necessary by also employing the below-described elemental analysis technique. The content of Fe in the zinc-iron alloy phase can be determined by a suitable elemental analysis technique such as an electron probe microanalyzer (EPMA), e.g., an energy dispersive X-ray analyzer (EDXA).

[Second Heating Step]

In the second heating step, the steel blank which was cooled in the first cooling step is heated to a temperature of at least the $Ac_3$ point of the steel constituting the steel sheet. In order to stabilize the mechanical properties of a member after quench hardening, it is preferable to heat the blank to a temperature in the range of around 800-1100° C. depending on the chemical composition of the steel. Taking into consideration the decrease in temperature which occurs until the next cooling step, the heating temperature is preferably at least 50° C. higher than the $Ac_3$ point in order to start press forming at a temperature equal to or higher than the $Ac_3$ point. A more preferred heating temperature is 880-1000° C.

During heating in the second heating step, if a liquid phase is formed on the surface of the steel sheet, problems having an adverse effect on the performance of a hot press-formed member or on the operation in press forming, such as vaporization or loss of zinc, or adhesion of zinc to the press dies in the subsequent hot press forming step which interferes with press forming may occur. As stated above, if heating is performed to a temperature above 800° C., due to this temperature which exceeds the melting point of a Zn-30% Fe alloy (782° C.), a liquid phase can be easily formed by rapid heating.

Therefore, in the second heating step as well, the heating rate is preferably not made too high so that mutual diffusion of Fe and zinc is allowed to proceed, resulting in the formation of an iron-zinc solid solution phase by dissolving zinc in Fe during heating. Specifically, the average rate of temperature increase up to 800° C. is preferably made at most 100° C. per second and more preferably at most 50° C. per second.

There is no particular limitation on the heating atmosphere for the second heating step. It may be any of ambient air, an atmosphere having a lower oxygen concentration than the ambient air (such as an air-nitrogen mixed gas), or an atmosphere which does not contain oxygen (such as a nitrogen atmosphere or an inert gas atmosphere). The dew point of the atmosphere is preferably in the range of 0-60° C.

The holding time at the heating temperature in the second heating step is selected such that this heating makes it possible to form a plating layer after hot press forming in which zinc is completely dissolved in iron to form a solid solution and the resulting zinc-containing surface region no longer contains an intermetallic compound phase or a pure zinc phase. The holding time for this purpose varies depending on the heating temperature, but in general, the residence time in a temperature region from the highest temperature to a temperature 50° C. lower than that is preferably 30 seconds to 5 minutes.

[Hot Press Forming Step]

A steel blank which is heated to at least the $Ac_3$ point and preferably to a temperature at least 50° C. higher than the $Ac_3$ point in the second heating step is press formed into a desired shape by press dies while it is in a temperature region no lower than the $Ac_3$ point, and then it is rapidly cooled to effect quench hardening. As a result, a high-strength hot press-formed member having a desired shape is manufactured. At this time, it is preferable to rapidly cool the press-formed member while its shape is restrained by the press dies, because the hot press-formed member has good shape accuracy.

In this description, rapid cooling refers to cooling using a liquid as a cooling medium. Examples of means for carrying out rapid cooling are use of dies in which water cooling tubes are provided directly underneath the surface of the dies or flow passages (grooves or the like) are provided in the dies so as to allow a cooling medium to run on the formed surface. The rate of rapid cooling is preferably at least 40° C. per second and more preferably at least 50° C. per second.

The resulting hot press-formed member has a surface region (namely, a surface portion containing zinc) which contains a zinc oxide layer and an iron-zinc solid solution phase but which does not contain an intermetallic compound phase or a pure zinc phase. Thus, the hot press-formed member manufactured as a product is is coated with a zinc-containing layer which does not contain brittle intermetallic compounds, so the occurrence of fine cracks and the like on its surface is minimized. In addition, it has excellent corrosion resistance after painting.

If the length of time for which the steel sheet is at a high temperature is too long in the second heating step and the hot press forming step, although it is advantageous for the formation of an iron-zinc solid solution phase, a large amount of scale forms on the surface of the steel sheet. Accordingly, the length of time in a high temperature region from the second heating step to the hot press forming step is preferably as short as possible. From this standpoint, the steel sheet is preferably transported as quickly as possible from the second heating step to the hot press forming step. Specifically, the time from the completion of heating in the second heating step until the temperature of the steel sheet is lowered to 700° C. by rapid cooling in the hot press forming step (this time is referred to as the residence time at 700° C. or above) is preferably at most 15 seconds.

In the present invention, it was found that by carrying out hot press forming after the first heating step in which zinc-iron alloying is promoted until the Fe content becomes at least 25 mass % and forming a structure in which zinc is entirely dissolved in iron, it becomes difficult for the zinc oxide layer to convert into scale during hot press forming, and the adhesion of the zinc oxide layer increases. It is thought that the increased adhesion of the zinc oxide layer contributes to the effect that good corrosion resistance after painting can be obtained in a stable manner.

A zinc-iron intermetallic compound phase, a zinc-iron solid solution phase, and a pure zinc phase in a surface region of a steel sheet can be identified by combined use of an X-ray diffractometer and an elemental analyzer such as an EPMA. Since the crystal structures of a zinc oxide phase, an intermetallic compound phase, and a pure zinc phase differ from that of α-Fe (the base metal), they can be distinguished only by X-ray diffraction. On the other hand, a solid solution phase to has the same crystal structure as the base metal (a body-centered cubic lattice), but due to its lattice constant which is larger than for the base metal, the two can be distinguished from each other. This phase can be identified as an iron-zinc solid solution phase by performing elemental analysis of a cross section using an EPMA or the like and ascertaining the presence of both zinc and iron.

There is no particular limitation on a zinc-based plated steel used in the present invention, and it can be selected from usual hot dip zinc-based plated steel sheet and electrolytic zinc-based plated steel sheet. Some specific examples of suitable types of a zinc-based plated steel sheet are an electrogalvanized (electrolytic zinc-plated) steel sheet, a hot dip galvanized (hot-dip zinc-plated) steel sheet, and a galvannealed (alloyed hot-dip galvanized) steel sheet. The coating weight of the plated steel sheet may be a usual one, a suitable range for which varies depending on the plating method.

The extent of the above-mentioned alloying varies with the type of plating, the plating method, and the coating weight. Therefore, the heating conditions in the first and second heating steps and particularly the heating conditions in the first heating step are selected in accordance with the zinc-based plated steel sheet which is used so as to obtain a desired structure in the surface region of the steel sheet after heating.

For example, in the case of a hot dip galvanized steel sheet, the plated coating has a low melting point (approximately 420° C.) and a Fe—Al alloy layer is formed in the interface between the plated coating and the steel substrate due to the presence of Al in the plating bath. Therefore, in order to adequately promote alloying, it is preferable that the rate of temperature increase in the first heating step not be too fast. From this standpoint, an electrogalvanied steel sheet and a galvannealed steel sheet are preferable because they do not have an interfacial alloy layer which impedes alloying in the interface between the plating and the steel. Furthermore, in the case of a galvannealed steel sheet, the melting point of the plated coating is relatively high (approximately 600° C. for a Zn-10% Fe alloy), so the ranges for the allowable heating temperature and heating rate are wider and handling is easier.

The chemical composition of the base metal steel sheet of a zinc-based plated steel sheet used in the present invention can be suitably set so that a hot press-formed member has properties such as a desired strength and so that quench hardening is possible.

EXAMPLES

Test pieces (having a sheet thickness of 1.6 mm and measuring 70 mm×150 mm) taken from a galvannealed steel sheet (GA), a hot dip galvanized steel sheet (GI), and an electrogalvanied steel sheet (EG) having the coating weights shown in Table 1 were subjected to a first heating step, a first cooling step, a second heating step, and a hot press forming step under the conditions shown in Table 1 to prepare hot press-formed members. The hot press forming step was carried out by sandwiching a test piece between flat dies immediately after the second heating step and performing cooling without carrying out forming (deformation). In each step, the change in the temperature of the test piece was monitored by a thermocouple attached to the test piece. Based on the temperature which was monitored in this manner, the rate of temperature increase, the holding time, and the duration in each step were determined.

Each of the base metal steel sheets contained, in mass %, C: 0.2%, Si: 0.2%, Mn: 1.3%, P: 0.005%, S: 0.001%, Cr: 0.2%, Ti: 0.02%, sol. Al: 0.045%, and B: 0.0015% and had an $Ac_3$ point of 830° C.

In the first and second heating steps, heating was carried out using a batch-type box heating furnace. The heating atmosphere was air (oxygen content of 21 volume %), a mixed gas of air and nitrogen, or pure nitrogen gas (oxygen content of 0%). In the first heating step, cooling was performed to a predetermined temperature while varying the cooling conditions using air cooling, water cooling, oil cooling, or the like.

Corrosion resistance after painting of the resulting flat plate-shaped hot press-formed members (Nos. 1-24) was evaluated as follows.

After each formed member was treated by alkali degreasing and zinc phosphating, it was painted by electrodeposition coating using a commercially-available epoxy resin-based cationic electrodeposition coating composition followed by baking to obtain a painted test piece having an electrodeposited coating film with a thickness of 15 μm on both surfaces. Each to painted test piece was given scratches using a narrow-blade knife and then immersed for 200 hours in an aqueous 5% NaCl solution at 60° C. The width of blisters from the scratches after immersion was measured, and the average value of the width of blisters was determined. An average width of blisters of at most 1 mm was evaluated as A, greater than 1 mm to at most 3 mm was evaluated as B, greater than 3 mm to at most 5 mm was evaluated as C, and greater than 5 mm was evaluated as D. A and B were evaluated as acceptable, and C and D were evaluated as unacceptable. This method for evaluating corrosion resistance after painting is considerably more severe than the evaluation methods described in Patent Documents 1-4. If the evaluation is acceptable by this evaluation method, it is determined that corrosion resistance after painting which is stable in actual use is exhibited.

The surface region of each test piece obtained after the first cooling step following the first heating step and of the test piece after the hot press forming step was investigated with respect to the composition, the structure, or the like in the following manner. The surface region of the steel sheet after the first cooling step was investigated using a separate test piece of the same zinc-based plated steel sheet which had undergone the first heating step and the first cooling step under the same conditions. When the temperature after the first cooling step was 50° C. or higher, investigation was carried out by water cooling the test piece immediately after the first cooling step was terminated followed by drying.

(1) Fe Content (Mass %) after the First Cooling Step:

The steel sheet was cut to obtain a cross section which was observed with a SEM at a magnification of 500-1000×, and the proportion of Fe with respect to the sum of Fe in Zn was determined by EDXA analysis at a position immediately beneath the zinc oxide layer in the surface region of the steel sheet.

(2) Presence or Absence of an Intermetallic Compound Phase and a Pure Zinc Phase after Hot Press Forming:

It was determined whether there was a peak assigned to a zinc-iron intermetallic compound phase or an η-zinc phase (pure zinc phase) in an X-ray diffraction pattern obtained by subjecting a cut steel member to X-ray diffraction from its surface. A peak assigned to zinc oxide was found in the X-ray diffraction pattern for each of test pieces Nos. 1-24, and it was determined that the oxide layer to in the surface region observed in below-described (3) was a layer based on zinc oxide, namely, it was a zinc oxide layer. When a peak assigned to a zinc-iron intermetallic compound phase or a pure zinc phase was not observed, it was determined that the zinc-containing layer of the surface region was constituted by a zinc oxide layer and an iron-zinc solid solution phase. The fact that the surface region was actually constituted primarily by an iron-zinc solid solution phase was ascertained by EDXA analysis of the surface region using a cross-sectional sample of the hot press-formed member.

(3) Observation of a Cross Section after Hot Press Forming:

A cross section of a hot press-formed test piece was cut out and embedded in a resin, and the cross section in the vicinity of the surface was observed with a SEM at a magnification of 500-1000×. An oxide layer (zinc oxide layer) was observed in the outermost surface, and immediately beneath it, a layer which was different from the base metal (a zinc-containing layer constituted by an iron-zinc solid solution phase) was observed. In the zinc oxide layer, a portion which was intimately adhered to the zinc-containing layer beneath it and a portion which turned to scale and was peeling were observed. The zinc oxide layer was observed at a minimum of 10 locations, and the average of the total length of the portions which were intimately adhered to the zinc oxide layer per 20 μm of observed length was determined. Cases in which the average value was a total of at least 14 μm (the total length of the peeled portions was at most 6 μm) were evaluated as "O" (acceptable), and cases in which it was less than 14 μm were evaluated as "X" (unacceptable). Since the adhesion of the zinc oxide layer affects corrosion resistance after painting as described below, corrosion resistance after painting could be evaluated using this adhesion as an index.

The results of the above investigations are shown in Table 1. Although not shown in Table 1, for the test pieces which had undergone the first heating step and the first cooling step before hot press forming, it was ascertained from SEM observation of a cross section that a zinc oxide layer was formed on the outermost surface layer of all of test pieces Nos. 1-24 as for the test pieces after hot press forming.

TABLE 1

| | Plated steel sheet | | | First heating step | | | | First cooling step | | Fe content (%) in surface region after 1st cooling step |
|---|---|---|---|---|---|---|---|---|---|---|
| No. | Type | Coating weight (g/m²) | Oxygen conc. in atmosphere (vol %) | Dew point (° C.) | Heating temp. (° C.) | Average rate of temp. increase (° C./s) | Holding time* (min) | Cooling temp. (° C.) | Residence time at 550° C. or higher (sec) | |
| 1 | GA | 55 | 21 | 13 | 600 | 30 | 20 | 20 | 6 | 27 |
| 2 | GA | 55 | 21 | 13 | 650 | 20 | 12 | 550 | 8 | 29 |
| 3 | GA | 55 | 21 | 13 | 700 | 20 | 10 | 50 | 10 | 30 |
| 4 | GA | 55 | 21 | 13 | 750 | 25 | 7 | 300 | 12 | 32 |
| 5 | GA | 55 | 21 | 13 | 750 | 50 | 6 | 20 | 12 | 35 |
| 6 | GA | 55 | 21 | 13 | 770 | 50 | 5 | 400 | 14 | 40 |
| 7 | GA | 55 | 21 | 13 | 800 | 35 | 15 | 400 | 14 | 40 |
| 8 | GA | 55 | 21 | 13 | 950 | 5 | 2 | 20 | 20 | 68 |
| 9 | GA | 55 | 2 | 40 | 630 | 15 | 15 | 20 | 7 | 26 |
| 10 | GA | 55 | 2 | 35 | 730 | 5 | 5 | 450 | 11 | 30 |
| 11 | GA | 55 | 21 | 13 | 750 | 130 | 2 | 20 | 18 | 46 |
| 12 | GA | 55 | 2 | 35 | 970 | 10 | 0.5 | 400 | 14 | 75 |
| 13 | GA | 55 | 21 | 13 | 540 | 10 | 25 | 20 | 0 | 16 |
| 14 | GA | 55 | 21 | 13 | 500 | 10 | 20 | 20 | 0 | 16 |
| 15 | GA | 55 | 21 | 13 | 700 | 5 | 4 | 580 | 10 | 16 |
| 16 | GA | 55 | 21 | 13 | 750 | 5 | 4 | 630 | 10 | 17 |
| 17 | GA | 55 | — | — | — | — | — | — | — | 12 |
| 18 | GA | 35 | 5 | 31 | 710 | 10 | 8 | 15 | 11 | 29 |
| 19 | GA | 65 | 5 | 31 | 750 | 15 | 5 | 100 | 12 | 30 |
| 20 | GA | 80 | 5 | 31 | 680 | 5 | 10 | 520 | 9 | 28 |
| 21 | GI | 85 | 20 | 17 | 700 | 5 | 3 | 15 | 10 | 27 |
| 22 | EG | 20 | 2 | 28 | 680 | 10 | 15 | 500 | 8 | 31 |
| 23 | EG | 40 | 2 | 28 | 680 | 10 | 9 | 100 | 8 | 30 |
| 24 | EG | 60 | 2 | 28 | 680 | 10 | 12 | 15 | 8 | 29 |
| 25 | GI | 85 | 20 | 17 | 700 | 70 | 1 | 15 | 10 | 3 |

| | Second heating step | | | | | Hot press forming step | Surface of formed member Presence | | Cross section after hot press forming (adhesion of zinc oxide layer) | |
|---|---|---|---|---|---|---|---|---|---|---|---|
| No. | Oxygen conc. in atmosphere (vol %) | Dew point (° C.) | Heating temp. (° C.) | Average rate of temp. increase (° C./s) | Holding time* (min) | Cooling rate (° C./s) | Residence time at 700° C. or higher (sec) | of intermetallic compound or pure zinc phase | Property Corrosion resistance after painting | | Remarks |
| 1 | 2 | 33 | 910 | 10 | 2 | 70 | 11 | No | B | O | Invent. |
| 2 | 2 | 33 | 910 | 10 | 2 | 70 | 11 | No | A | O | Invent. |
| 3 | 2 | 33 | 910 | 10 | 2 | 70 | 11 | No | A | O | Invent. |
| 4 | 2 | 33 | 910 | 10 | 2 | 70 | 11 | No | B | O | Invent. |
| 5 | 21 | 33 | 910 | 100 | 1 | 70 | 11 | No | B | O | Invent. |
| 6 | 2 | 33 | 910 | 10 | 2 | 70 | 11 | No | C | X | Compar. |
| 7 | 2 | 33 | 910 | 10 | 2 | 70 | 11 | No | C | X | Compar. |
| 8 | 2 | 33 | 910 | 10 | 2 | 70 | 11 | No | D | X | Compar. |
| 9 | 2 | 33 | 910 | 10 | 2 | 70 | 11 | No | B | O | Invent. |
| 10 | 2 | 33 | 910 | 10 | 2 | 70 | 11 | No | B | O | Invent. |
| 11 | 21 | 30 | 910 | 100 | 1 | 70 | 11 | No | D | X | Compar. |
| 12 | 2 | 33 | 910 | 10 | 2 | 70 | 11 | No | D | X | Compar. |
| 13 | 2 | 33 | 910 | 10 | 2 | 70 | 11 | No | D | X | Compar. |
| 14 | 2 | 33 | 910 | 10 | 2 | 70 | 11 | No | D | X | Compar. |
| 15 | 2 | 33 | 910 | 10 | 2 | 70 | 11 | No | D | X | Compar. |
| 16 | 2 | 33 | 910 | 10 | 2 | 70 | 11 | No | D | X | Compar. |
| 17 | 2 | 33 | 910 | 10 | 2 | 70 | 11 | No | C | X | Compar. |
| 18 | 21 | 18 | 960 | 8 | 2 | 90 | 13 | No | A | O | Invent. |

TABLE 1-continued

| | | | | | | | | | | | |
|---|---|---|---|---|---|---|---|---|---|---|---|
| 19 | 21 | 18 | 960 | 8 | 2 | 90 | 13 | No | A | ○ | Invent. |
| 20 | 21 | 18 | 960 | 8 | 2 | 90 | 13 | No | A | ○ | Invent. |
| 21 | 2 | 32 | 930 | 5 | 2 | 65 | 10 | No | A | ○ | Invent. |
| 22 | 0 | 39 | 900 | 10 | 1 | 60 | 12 | No | A | ○ | Invent. |
| 23 | 0 | 39 | 900 | 10 | 1 | 60 | 12 | No | A | ○ | Invent. |
| 24 | 0 | 39 | 900 | 10 | 1 | 60 | 12 | No | A | ○ | Invent. |
| 25 | 2 | 32 | 930 | 5 | 2 | 65 | 10 | Yes | D | ○ | Compar. |

*Holding time: Residence time in the temperature region between the highest temperature and 50° C. lower than the highest temperature.

As shown in Table 1, an effect of improving corrosion resistance after painting was not obtained when the rate of temperature increase in the first heating step was at least 70° C. per second, when the heating temperature in the first heating step was higher than 750° C., when the heating temperature in the first heating step was lower than 600° C., when cooling after the first heating was to a temperature higher than 550° C., or when the first heating step was not carried out.

For all the samples which had poor corrosion resistance after painting except for No. 25 in which an intermetallic compound phase (Γ phase) was detected, the adhesion of the zinc oxide layer was also evaluated as "X" (unacceptable). Evaluation of the adhesion of a zinc oxide layer by the above-described observation method may cause the zinc oxide layer to separate or peel off at the time of cutting and processing to obtain a cross section for observation, so there is a considerably large variation in the results, and the results are considered only a rough index for evaluation. However, it is thought that the adhesion of a zinc oxide layer has a large effect on corrosion resistance after painting, and it is conjectured that the heating temperature and the heating rate largely influence the adhesion of a zinc oxide layer.

In No. 25, the Fe content of the surface region of the steel sheet after the first heating step and the first cooling step was an extremely low value of 3 mass %, so an intermetallic compounds (Γ phase) was detected in the surface region of the formed article after hot press forming. In this example, the adhesion of the zinc oxide layer was good, but corrosion resistance after painting was extremely poor.

The invention claimed is:

1. A method for manufacturing a hot press-formed member characterized by
subjecting a zinc-based plated steel sheet to heat treatment which includes a first heating step in which the steel sheet is heated in an oxygen-containing atmosphere to a temperature region of at least 600° C. to at most 750° C. at an average rate of temperature increase up to 600° C. of at most 50° C. per second and a first cooling step in which the steel sheet which was heated in the first heating step is cooled to 550° C. or below, thereby forming a steel blank having on the surface of the steel sheet a zinc oxide layer constituting an uppermost layer and below it a zinc-iron alloy phase having an Fe content of at least 25 mass %, and
heating the steel blank in a second heating step to a temperature of at least the $Ac_3$ point of the steel constituting the sheet, and carrying out a hot press forming step on the heated steel blank by starting press forming when the temperature of the steel blank is at least the $Ac_3$ point and rapidly cooling the press-formed member, thereby obtaining a hot press-formed member having a surface region which has a zinc oxide layer and an iron-zinc solid solution phase and which does not contain an intermetallic compound phase or a pure zinc phase.

2. A method as set forth in claim 1 wherein the second heating step is carried out such that the average rate of temperature increase up to 800° C. is at most 100° C. per second.

* * * * *